Feb. 28, 1967   N. POOLOS   3,306,064
SWITCH ACTUATOR ASSEMBLY FOR AN ICE MAKER
Filed March 29, 1965   6 Sheets-Sheet 1
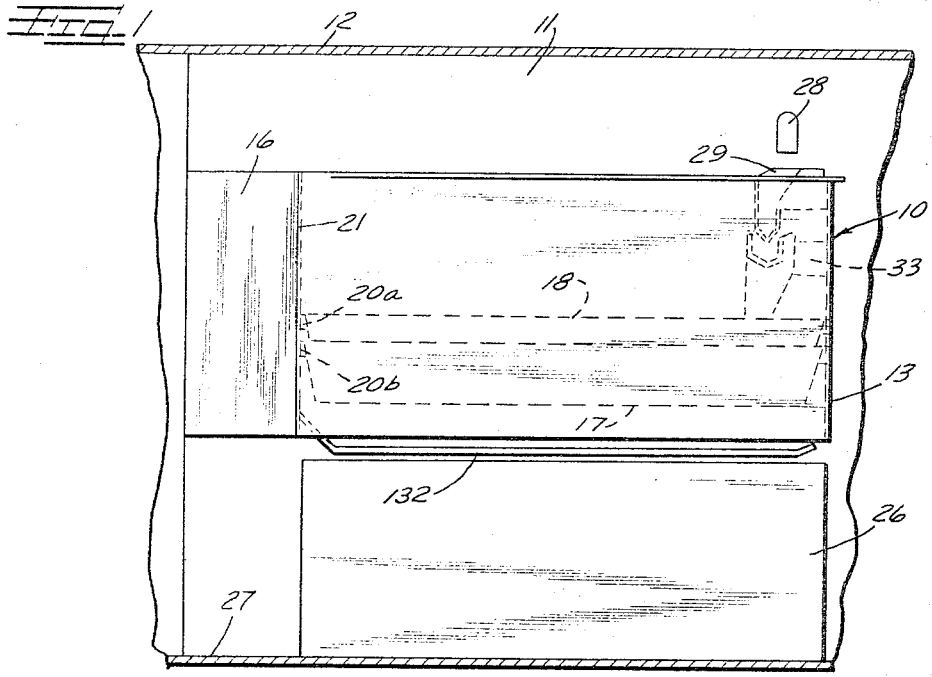
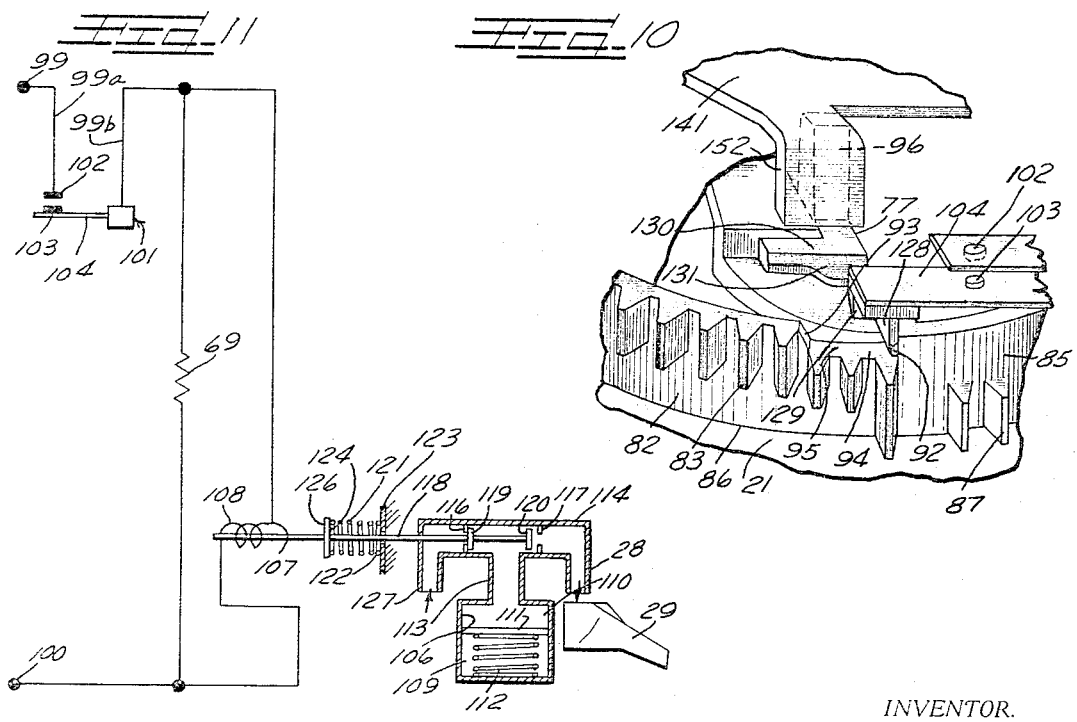
INVENTOR.
NICK POOLOS
ATTORNEYS

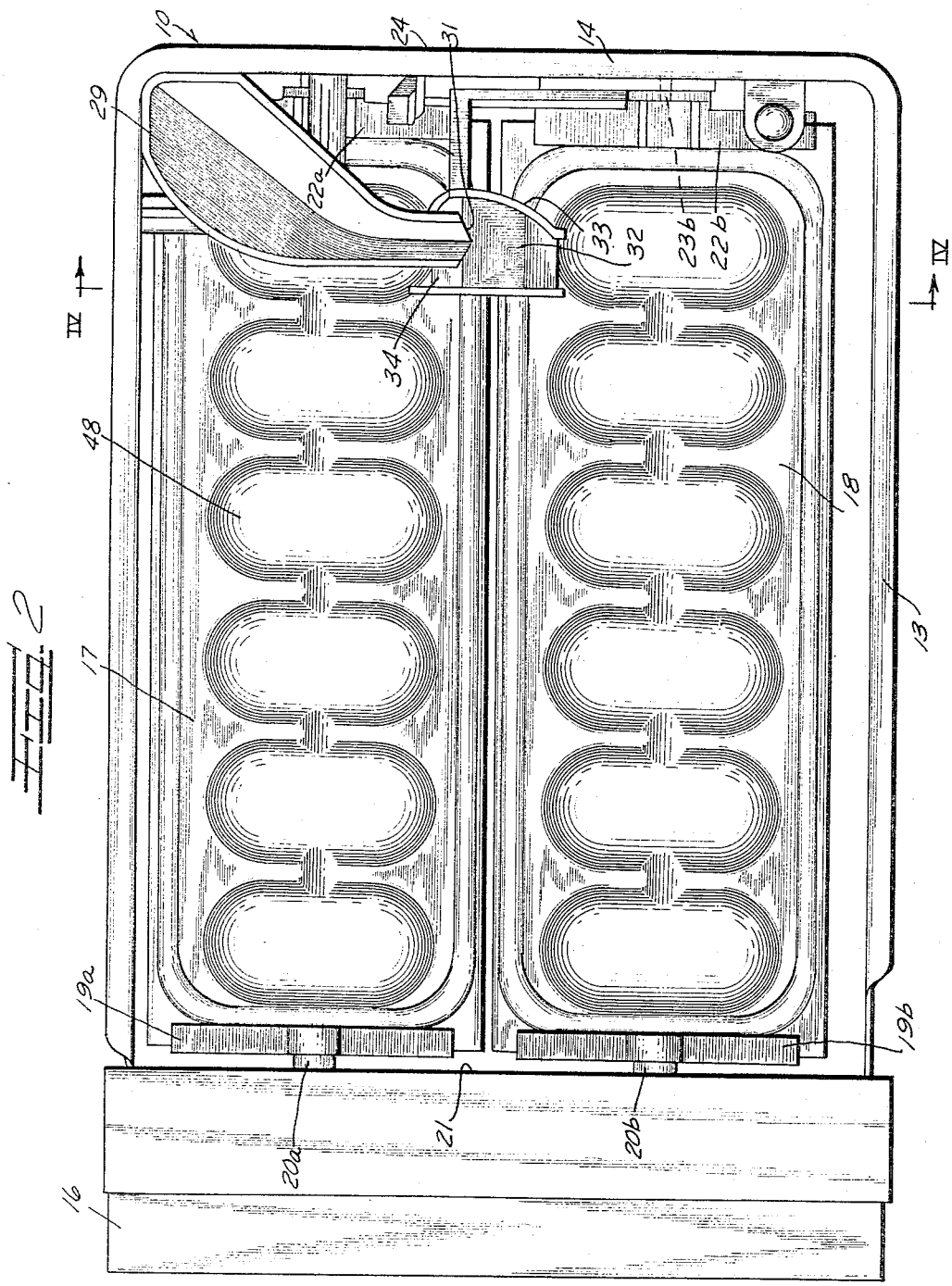

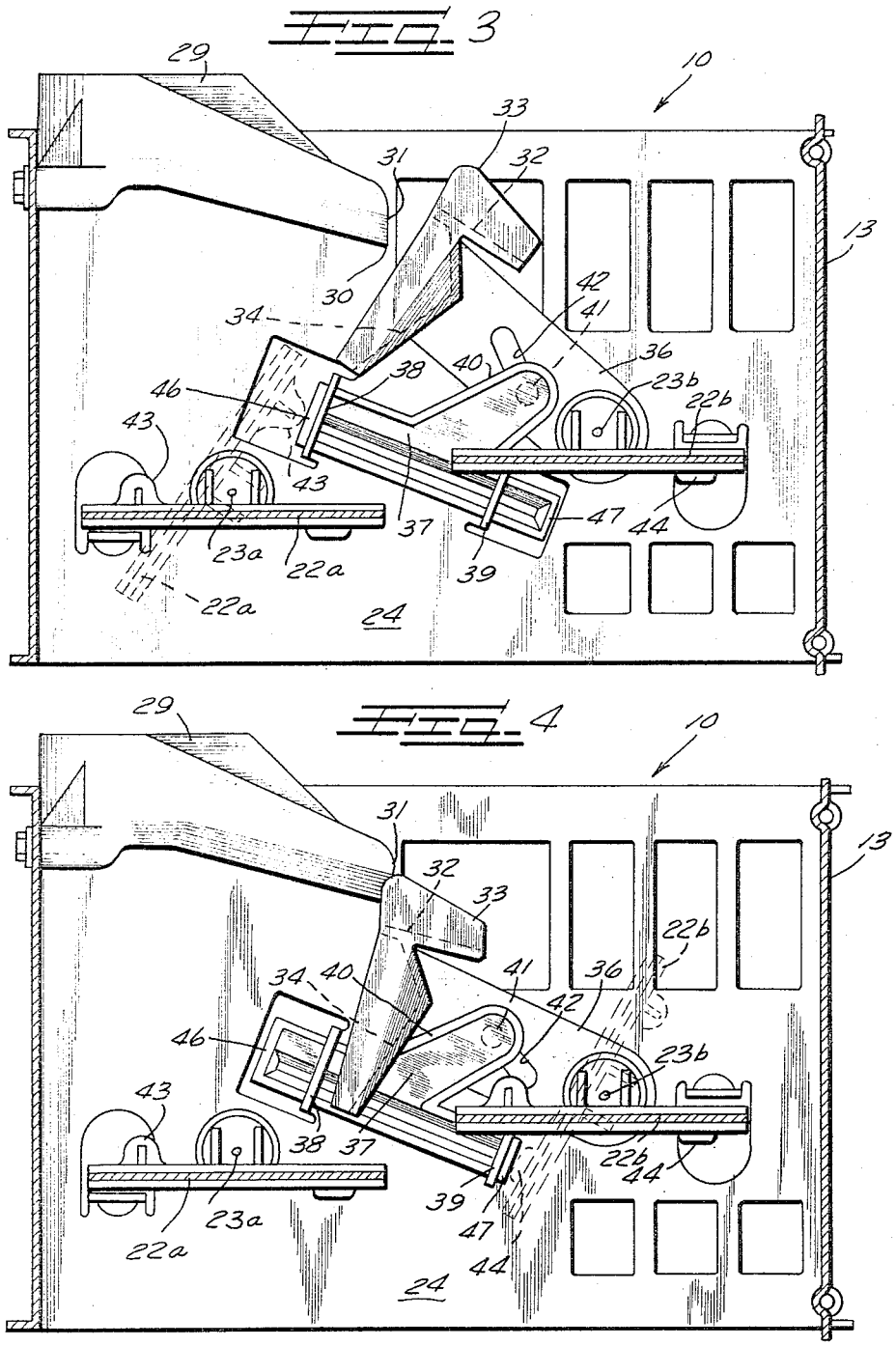

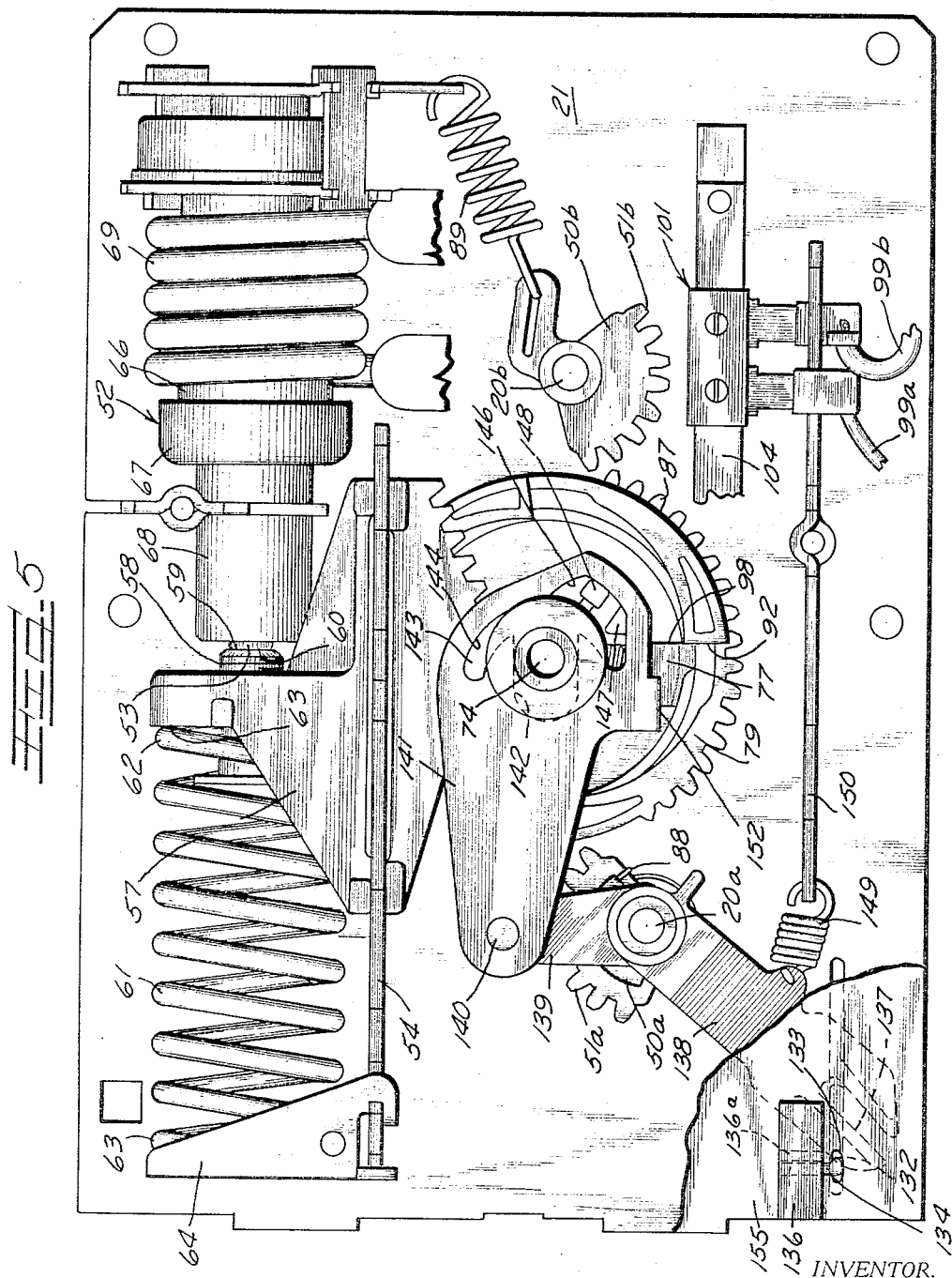

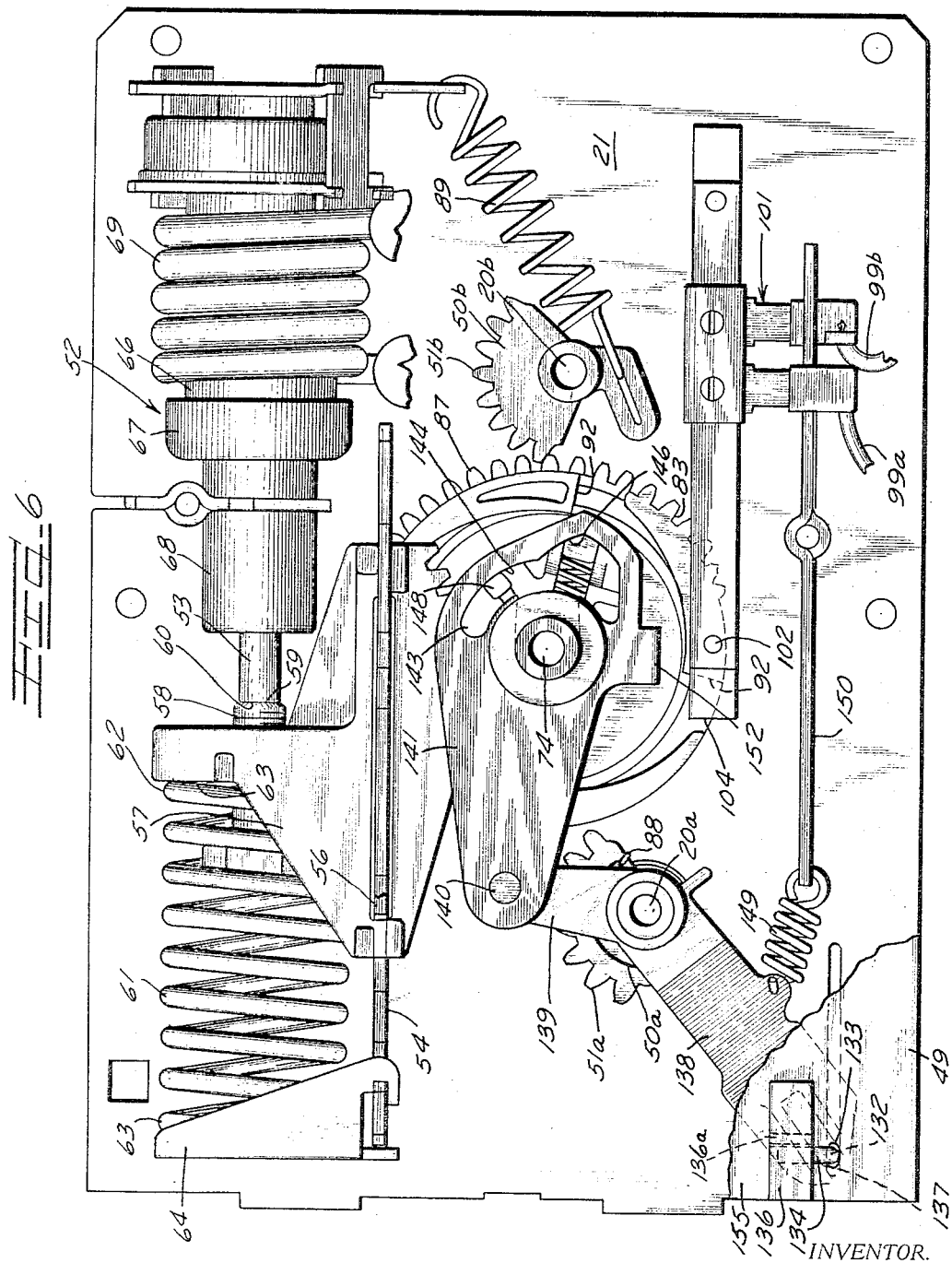

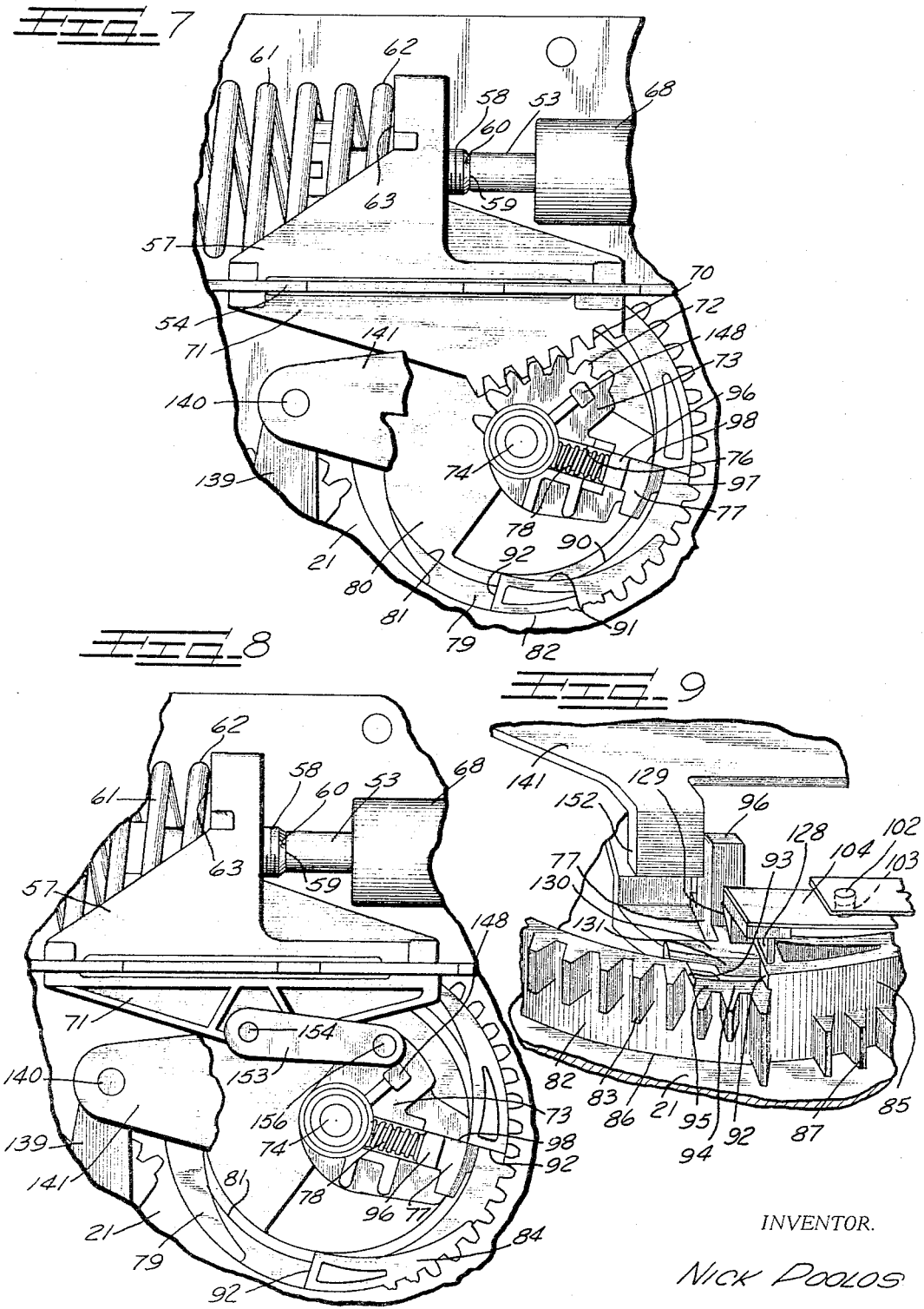

United States Patent Office 3,306,064
Patented Feb. 28, 1967

3,306,064
SWITCH ACTUATOR ASSEMBLY FOR
AN ICE MAKER
Nick Poolos, Chicago, Ill., assignor to The Dole
Valve Company, Morton Grove, Ill., a corporation of Illinois
Filed Mar. 29, 1965, Ser. No. 443,215
11 Claims. (Cl. 62—137)

This invention relates generally to ice making apparatus and more particularly to an ice maker which utilizes flexible trays of the type adapted to eject ice therefrom when the trays are inverted and twisted, and a frame for rotatably mounting one or more trays thereon. A pair of gears or the like driving and driven members are mounted for relative rotational movement on the frame with one of the gears connected to the trays for imparting an inverting and twisting movement thereto.

The second gear is driven in an oscillatory rotatable manner by suitable electric power means and a cooperating pawl and shoulder arrangement is carried on the gears to provide a clutch mechanism therebetween to drive the first gear (and therefore to invert and to twist the trays) intermittently in response to the oscillatory movement of the second gear. In addition the pawl serves to operate a switch mechanism for the power means and a stop mechanism is provided in association with an ice collection sensing arrangement to render the pawl inoperative with respect to the switch when sufficient ice is contained within an ice collection basket below the trays.

The power means may comprise a temperature sensitive power unit having a rectilinearly telescopically extensible piston or plunger and an electric heater for heating the unit. Suitable linkage means are provided for translating the rectilinear movement of the piston into rotational movement of the second gear. An electric water flow valve is provided to control the filling of the trays and may also be actuated by the same switch mechanism which operates the power means.

It is, therefore, an object of the present invention to provide, in ice making apparatus employing trays of the type which eject ice therefrom upon rotation thereof, improved means for filling the trays with water to form ice and for inverting the trays to eject the ice therefrom.

Another object of the invention is to provide a clutch mechanism for connecting a power source to the trays for inverting the trays and including a pair of relatively rotatable members and a cooperating pawl and shoulder arrangement for converting oscillatory rotatable movement of one of the rotatable members to intermittent rotational movement of the other of the rotatable members.

Another object of the invention is to provide an electric power means for turning one of the rotatable members and a switch actuated in response to movement of the pawl in the clutch mechanism for controlling the power means.

Another object is to provide an electric water valve for filling the trays and a switch actuated in response to the movement of the pawl in the clutch mechanism for controlling the water valve.

Another object is to provide a switch mechanism actuated in response to the relative disposition of a driving component and a relatively movable driven component.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a front elevational view of ice making apparatus constructed in accordance with the principles of the present invention mounted for purposes of illustration in the freezing compartment of a household refrigerator;

FIGURE 2 is a top plan view of the ice making apparatus shown in FIGURE 1;

FIGURE 3 is similar to FIGURE 4 but illustrates in broken lines the other of the mounting brackets shown in its inverted position;

FIGURE 4 is a vertical sectional view taken substantially along lines IV—IV of FIGURE 2 with the ice trays of the apparatus removed for clarity and with mounting brackets for the ice trays shown in an upright position in full lines and with one of the mounting brackets shown in its tilted position in broken lines;

FIGURE 5 is a side elevational view of the ice making apparatus of the invention as viewed from the left hand side of FIGURES 1 or 2 and having only a portion of an outer wall of the apparatus illustrated in order to show the relative disposition of parts when the ice tray mounting brackets are positioned as shown in the full lines of FIGURE 3;

FIGURE 6 is similar to FIGURE 5 but shows the relative disposition of part when the ice tray mounting brackets are positioned as shown in the broken lines of FIGURE 4;

FIGURE 7 shows a portion of the side elevational view of FIGURE 6 with parts removed to emphasize a clutch mechanism of the invention in the position it assumes in FIGURE 6;

FIGURE 8 is similar to FIGURE 7 but illustrates an alternative arrangement for driving the clutch mechanism;

FIGURE 9 is a fragmentary perspective view of portions of the clutch mechanism and associated parts shown in the relative positions they assume in FIGURE 5;

FIGURE 10 is similar to FIGURE 9 but shows the relative disposition of the parts when the ice making apparatus is in a different phase of its operation; and FIGURE 11 is a schematic diagram of electric circuitry and related parts of the invention.

As shown in the drawings:

Although the principles of the present invention are applicable in any ice making apparatus a particularly useful application is made to apparatus for making ice cubes in a household refrigerator and in the illustrated embodiment shown in FIGURE 1 the ice making apparatus indicated generally at reference character 10 which is constructed in accordance with the principles of the present invention, is shown mounted in a freezer compartment 11 of a household refrigerator 12.

Referring to FIGURES 2–4 in conjunction with FIGURE 1, the ice making apparatus 10 is more particularly characterized as comprising a frame 13 which includes a three-sided or U-shaped sheet-form member 14 and a rectangularly shaped box or casing 16 fixedly connected to the three-sided member 14 at the open end thereof. The box or casing 16 houses the operating or driving mechanism of the invention.

A pair of ice cube trays 17 and 18 are situated in aligned arrangement within the confines of the frame 13. Each of the trays is supported at opposite ends thereof for rotation about its longitudinal axis by means of a pair of tray mounting brackets. For example, tray 18 is fixedly connected at one end thereof to a tray mounting bracket 19b which is, in turn, mounted for corotation on a rotatable shaft 20b which projects outwardly from a back wall 21 of the casing 16. An opposite end of the tray 18 is fixedly mounted on a tray mounting bracket 22b which is, in turn, mounted for rotation on a small shaft or pin 23b which projects from an end plate 24 of the member 14.

The tray 17 is similarly mounted for rotation about its longitudinal axis on tray mounting brackets 19a and 22a and it will be noted that the forward or front tray 18 is mounted slightly higher than is the rear tray 17.

An ice collection basket 26 (FIGURE 1) is shown positioned below the trays 17 and 18 in order to receive and collect ice ejected from the trays and in the illustrated embodiment the basket 26 rests on a bottom wall 27 of the freezer compartment 11.

The present invention contemplates completely automatic formation of ice or ice particles such as cubes in an operation that comprises the steps of first automatically filling one of the trays with water to a predetermined level, then rotating the other of the trays to dump or eject ice cubes previously formed therein into the ice collection basket, then filling said other of the trays with water for the formation of additional cubes, then rotating said one of the trays to dump the ice cubes then formed therein, and then repeating the operation or cycle over and over until the amount of ice in the collection basket, as determined by an automatic collection sensing arrangement after each tray is dumped, is sufficient such that additional cubes are not required. Then the operation ceases until such time as enough cubes have been removed from the collection basket so that the sensing arrangement is effective to cause a resumption of the ice forming operation.

The mechanism for automatically and successively filling the trays with water comprises a nozzle 28 positioned above the trays 17 and 18 and connected by means of a suitable plumbing arrangement to a source of water. A water valve is included in the plumbing circuitry to supply a predetermined amount of water to the trays throughout the ice forming operation.

The water which flows from the nozzle 28 is directed to a stationary trough 29. A lower end 30 of the trough 29 comprises an open lip 31 from which the water flows to a forwardly downwardly inclined surface 32 of a swingable trough 33, which is positioned as illustrated in FIGURE 3 to fill the forward or front ice tray 18, or to a backwardly downwardly inclined surface 34, positioned as shown in FIGURE 4, to fill the rear tray 17.

The swingable trough 33 is mounted on an arm 36 which is, in turn, pivotally mounted on the shaft 23b. The arm 36 is pivoted between the positions illustrated in FIGURES 3 and 4 by means of a sliding arm 37 guided for reciprocal rectilinear movement by means of a pair of U-shaped guide members 38 and 39 mounted on the wall 24 of the frame 13 and having extending from a protrusion 40 thereof a pin 41 which is received in a slot 42 formed in the pivot arm 36.

Suitable abutment surfaces 43 and 44 are formed respectively on the tray mounting brackets 22a and 22b to engage opposite ends 46 and 47 of the slidable arm 37 so as to move the arm 37 back and forth as the mounting brackets are turned or inverted.

The ice trays 17 and 18 are preferably of the type which dislocate and eject ice particles formed in ice wells 48 thereof when the trays are turned and somewhat twisted about their longitudinal axis. Such trays are known, and may be formed of a plastic, flexible material such as high density or linear polyethylene or the like composition although it will be appreciated from the ensuing description of the invention that other trays having different modes of dislocating ice particles therefrom can also be advantageously utilized.

As noted, much of the operating mechanism of the invention resides within the box or casing 16 and referring to FIGURE 5 wherein the greater portion of an end wall 49 of the casing 16, situated opposite the end wall 21, is cut away for purposes of clarity, it will be noted that a pair of sector gears 50a and 50b are fixedly mounted on the shafts 20a and 20b for corotation with the shafts. Shafts 20a and 20b are, in turn, journalled for rotation on the end wall 21 of the casing 16.

Sector gears 50a and 50b have teeth 51a and 51b formed thereon which extend, respectively, in an arc of about 90°, and in the position of the sector gears shown in FIGURE 5, wherein teeth 51a are facing substantially upwardly and teeth 51b are facing substantially downwardly, the shafts 20a and 20b are positioned such that the tray mounting brackets 22a and 22b are in their normal or upright positions as shown in the full lines of both FIGURES 3 and 4.

In accordance with the invention suitable power means are provided for alternatively rotating the sector gears 50a and 50b through the arc of the gear teeth formed thereon, and correspondingly for rotating their respective shafts 20a and 20b, in order to tilt or invert the ice trays 17 and 18, and in the illustrated embodiment such power means comprises a temperature sensitive power unit indicated generally at 52 having a telescopically extensible piston or pin member 53 which projects outwardly from a retracted position thereof as shown in FIGURE 5 to an extended position as shown in FIGURE 6 upon the application of heat to the power unit 52.

The power unit 52 is fixedly connected to the wall 21 of the casing 16 and also mounted on the wall 21 is a flat elongated guide member 54 which extends in parallel relation to the axis of the power unit 52 and which has an axially extending track means or groove 56 formed therein for guiding in rectilinear movement a sliding bracket 57.

An axially adjustable threaded plug 58 is mounted on the sliding bracket 57 in concentric alignment with the pin or plunger 53 of the power unit 52 for adjusting the relative disposition of the bracket 57 with respect to the plunger 53.

Biasing means are provided for biasing the sliding bracket 57 toward the power unit 52 so that an end wall 59 of the plug 58 is maintained in abutting engagement with an end wall 60 of the pin 53 and for this purpose a coil spring 61 having a relatively high "k" factor is bottomed at one end thereof as at 62 against a shoulder 63 of the bracket 57, and is bottomed at an opposite end thereof at 63 against a flange 64 fixedly mounted on the casing wall 21.

The temperature sensitive power unit 52 is of a type well known in the art and includes a temperature sensitive portion 66, a collar 67 and a guide portion 68 in addition to the telescopically extensible plunger or power member 53.

Suitable heating means which, in the illustrated embodiment of the invention, comprises a heater coil 69, is wrapped around the temperature sensitive portion 66 and it will be appreciated that when the coil 69 is electrically energized or otherwise heated, the plunger 53 thereof will move gradually outwardly from its retracted position as illustrated in FIGURE 5 to its extended position as shown in FIGURE 6. The sliding or follower bracket 57 follows the movement of the plunger 53, and upon de-energization of the coil 69 and cooling of the temperature sensitive portion 66, the plunger 53 will gradually retract to its position as shown in FIGURE 6 due to the biasing effect of the spring 61.

As is illustrated clearly in FIGURE 7, a sloping gear rack 70 is formed on a lower portion 71 of the follower or sliding bracket 57 and is adapted to mesh with gear teeth 72 formed on a complementarily shaped spiralform drive gear 73 mounted for free rotation about a shaft 74 supported between the casing walls 21 and 49.

The drive gear 73 has formed therein a radially outwardly extending groove or channel 76 which receives in sliding relation a pawl member 77 which is biased radially outwardly in the channel 76 by means of a helical spring 78.

It will be apparent that as the plunger 53 moves from its retracted position as shown in FIGURE 5 to its extended position as shown in FIGURES 6 or 7, the drive gear 73, and correspondingly the pawl 77, is rotated from the position therein shown to the position shown in FIGURE 7, wherein the pawl 77 has rotated approximately 90°.

Also mounted for free relative rotation on the shaft 74 axially of the drive gear 73 is a multi-faced gear 79 having an axially extending recess 80 formed therein which is bounded at the periphery thereof by a circumferentially continuous axially extending peripheral wall 81. The axial depth of the recess 80 is sufficient such that a substantial portion of the drive gear 73 but excluding, of course, the gear teeth 72, is housed within the recess 80 of the multi-faced gear 79.

Along an outer periperal wall 82 of the gear 79 are various sets of gear teeth for engaging and for driving the sector gears 50a and 50b. As is best shown in FIGURE 9, some of the gear teeth as at 83 are formed adjacent one axial end 84 of the outer peripheral wall 82, and in the same arc in which the teeth 83 are formed the opposite side of the wall 82 adjacent an axial end 86 thereof is blank or free of gear teeth.

Another set of gear teeth 87 is formed on the outer peripheral wall 82 to extend circumferentially in an arc adjacent the arc in which the gear teeth 83 reside, and it will be noted in connection with the teeth 87 that the side of the wall 82 adjacent the axial end 84 thereof is blank, while the teeth 87 are in this instance formed along the axial end 86 of the wall 82.

Referring again to FIGURE 5, the sector gears 50a and 50b are normally maintained in the positions shown therein by means of suitable biasing members which, in the illustrated embodiment, comprise respectively a torsion spring 88 wound about the shaft 20a and connected at opposite ends thereof to the shaft and to the sector gear 50a, and a tension spring 89 connected at one end thereof to the sector gear 50b and at an opposite end thereof to the casing wall 21.

In addition, the sector gears 50a and 50b are offset with respect to the planes in which the gear teeth 51a and 51b reside, such that the teeth 51a of the sector gear 50a will mesh with the gear teeth 83 of the multi-faced gear 79, but will not mesh with the gear teeth 87, and the teeth 51b of the sector gear 50b will mesh with teeth 87 of the gear 79, but not with teeth 83.

Referring again to FIGURE 7, the peripheral wall 81 of the multi-faced gear 79 comprises a plurality of circumferential segmental portions with each of said portions comprising a circular span or section 90 which leads to a radially inwardly inclined section 91 which terminates at a radially extending shoulder surface 92.

Referring to FIGURE 9, it will be noted that each of the shoulder surfaces 92 also forms an end wall of a recess 95 formed in the axial end wall 84 of the gear 79, each of such recesses also being bounded by another wall 93 spaced circumferentially with respect to wall 92, and a radially extending back wall 94.

The drive gear 73 and the pawl 77 comprise a clutch mechanism for translating reciprocal rectilinear movement of the follower bracket 57 into intermittent rotational movement of the multi-face gear 79, and for this reason it will be noted in FIGURES 7 and 9 that the pawl 77 comprises a pillar or abutment column 96 against which one end of the spring 78 bottoms. A radially outwardly facing wall 97 of the pawl is positioned to slidingly engage the inner peripheral wall 81 of the gear 79, and to be guided in radial movement thereby. Another wall of the pawl, namely, a radially extending side wall 98, is shaped complementarily to the shoulder surfaces 92.

Referring to FIGURE 5, when the electric coil 69 is de-energized and the power unit 52 is cooled and the plunger 53 has moved to its retracted position as illustrated, the follower bracket 57 is situated in its rightward position as illustrated in the drawing, and the radial wall 98 of the pawl 77 is in abutting engagement with one of the shoulder surfaces 92 of the multi-face gear 79.

Subsequently, upon energization of the coil 69, as the plunger 53 moves outwardly to its extended position as illustrated in FIGURE 6, the follower bracket 57 is moved leftwardly as viewed in the drawing, whereupon the drive gear 73 is rotated approximately 90° in a counterclockwise direction. As a result of this rotation of the drive gear 73, the gear 79 is also rotated through the same arc by the pawl 77.

As the gear 79 is rotated counterclockwise the gear teeth 87 formed thereon will engage and mesh with the gear teeth 51b of the sector gear 50b and rotate the sector gear 50b clockwise for about 90 or more degrees to tilt and twist the ice tray 18, whereupon the ice will be dumped therefrom. The teeth 87 are arranged so as to extend in an arc which is less than the arc through which the gear 79 rotates as a result of the rotation of the drive gear 73. As a consequence after all of the teeth 51b have meshed with corresponding teeth 87 of the gear 79 they are then exposed to a blank portion 85 of the gear 79, upon the happening of which the sector gear 50b will immediately spring back to its normal position as viewed in FIGURE 5, thereupon returning the ice tray 18 to its normal or upright position.

As the power unit 52 cools upon de-energization of the coil 69, and the piston or plunger 53 is retracted, the follower bracket 57 moves rightwardly, whereupon the drive gear 73 is rotated clockwise. During such clockwise rotation the pawl 77, the radial wall 97 of which is urged against the inner peripheral wall 81 of the gear 79 by the spring 78, is guided first by a circular section 90 of the wall 81, and then by a radially inwardly inclined section 91 thereof until the radial wall 98 of the pawl is moved back again to "snap" into abutment with another shoulder surface 92 as shown in FIGURE 5. It will be appreciated that during this clockwise rotation of the driver gear 73 the multi-face gear 79 remains stationary. The next time the coil 69 is energized, and the drive gear 73 is again rotated approximately 90° counterclockwise, the gear teeth 83 of the gear 79 will engage the teeth 51a of the section gear 50a to tilt and twist the ice tray 17, the sector gear 50b and the ice tray 18 being maintained in normal or upright position during this phase of the operation. It will be appreciated, therefore, that each time the coil 69 is energized and the plunger 53 moves to its extended position, and then the coil is de-energized and the plunger retracted, the multi-face gear 79 has been rotated approximately 90° in a counterclockwise direction and one of the ice trays has been tilted and dumped.

Referring to the schematic wiring diagram of FIGURE 11, the electric heating coil 69 is connected through suitable electric circuitry to a pair of contacts 99 and 100 for connection to a source of electric power, and such electric circuitry comprises an electric switch indicated generally at 101 having a pair of electric contacts 102 and 103 which are normally biased in spaced-apart relation by means of an electrically conductive spring 104.

An electrically operated water valve 106 for supplying water in predetermined quantities to the ice trays 17 and 18 comprises an electric solenoid operating member 107 having an electric coil or winding 108 connected in parallel with the electric heating coil 69.

In addition, the water valve 106 comprises a valve housing 109 having a chamber 110 formed therein and adapted to receive a slidable member or piston 111 which is biased in one direction by a spring member 112.

The valve housing 109 is connected by means of a throat 113 to a conduit 114 having formed therein a pair of valve seats 116 and 117.

A valve rod 118 projects at one end thereof into the coil 108 and at the other end thereof into the conduit 114, and has mounted thereon a pair of valve members 119 and 120 which are spaced a distance less than the distance between the valve seats 116 and 117. A tension spring 121 is wrapped about the rod 118 centrally thereof and is bottomed at one end thereof as at 122 against a stationary member 123, while an opposite end 124 thereof is bottomed against a spring collar 126 connected in fixed assembly to the rod 118 whereby the valve member 119 is normally biased against the valve seat 116.

One end of the conduit 114, as at reference numeral 127, is adapted to be connected to a source of water, while the opposite end of the conduit 114 forms the water nozzle 28 (FIGURE 1) which overlies the stationary trough 29.

It will thus be appreciated that when the heating coil 69 is energized, the water valve solenoid coil 108 will also be energized to urge the rod 118 rightwardly as viewed in FIGURE 11, thereby seating the valve member 120 against the valve seat 117. Supply water then flows through the conduit 114 and the throat 113 into the chamber 110 to urge the piston member 111 downwardly in response to the pressure of the water source.

When the solenoid coil 108 is de-energized, the spring 121 urges the rod 118 leftwardly as viewed in FIGURE 11 to again seat the valve member 119 on the valve seat 116 whereupon the piston member 111 forces the water contained in the chamber 110 out through the nozzle 28 to fill one of the ice trays.

Electric switch 101 is actuated by the pawl 77 of the clutch mechanism, and referring again to FIGURE 9, it will be noted that the electrically conductive spring 104 which has the contact 103 formed thereon is positioned adjacent the axial end wall 84 of the gear 79. In addition it will be noted that the spring 104 also has mounted thereon a radial wall 128 and an inclined wall 129. A top wall 130 of the pawl 77 terminates in a front portion 131 which also slopes similarly to the inclined wall 129. The top wall 130 of the pawl 77 extends circumferentially a distance greater than the circumferential distance between the shoulder surface 92 and the wall 93 of the multi-faced gear 79, so as to effectively span the "gaps" formed by the respective recesses 95 in the end wall 84 of the gear 79 between the walls 92 and 93 thereof.

The switch 101 and including the electrically conductive spring 104 are fixedly mounted on the wall 49 of the casing 16, and the radial wall 128 of the spring 104 is situated so as to move downwardly adjacent a shoulder surface 92 into a recess 95 due to the inherent bias of the spring 104. As a consequence electric contact 103 formed on the spring 104 is normally in spaced-apart relation with respect to the stationary contact 102 as a result of the bias of the spring 104.

It will be noted, however, that as the driver gear 73 and the pawl 77 are rotated clockwise with respect to the gear 79, and particularly when the pawl 77 passes a shoulder surface 92 thereby to be moved radially outwardly due to the spring 78 (such action of the pawl 77 occurring upon complete retraction of the plunger 53) the sloping wall 131 of the pawl 77 engages the inclined wall 129 of the spring 104 to move the contact 103 into abutting engagement with the contact 102, thereby energizing both the heating coil 69 and the solenoid 108 of the water valve.

After the heating coil 69 is energized, the driver gear 73 along with the pawl 77 and the multi-face gear 79 will begin to move corotatably counterclockwise. The electric contacts 102 and 103 will remain closed, however, since the radial wall 128 of the switch spring 104 will remain in engagement with the top wall 130 of the pawl 77 until the pawl rotates past the radial wall 128, whereupon the wall 128 will engage the axial end wall 84 of the gear 79 to prevent movement of the spring 104 and to maintain the contacts 102 and 103 in closed relation.

After the driver gear 73 and the multi-face gear 79 have rotated about 90° (FIGURE 7) another shoulder surface 92, and a recess 95 formed in the end wall 84 adjacent thereto, will move into alignment with the radial wall 128 of the spring 104, whereupon the radial wall 128 will be urged down into the recess thereby opening the electric contacts 102 and 103 to de-energize the electric heating coil 69.

As the temperature sensitive power unit 52 is cooled and the plunger 53 thereof retracts, the driver gear 73 as well as the pawl 77 will again rotate clockwise, and as the wall 98 of the pawl passes the shoulder surface 92 which has moved into position adjacent the radial wall 128 of the spring 104, the pawl will then be urged radially outwardly, thereupon engaging the spring 104 to once again close the electric contacts 102 and 103 to energize the electric heating coils 69.

It will thus be appreciated that the ice forming cycle whereupon each of the ice trays 17 and 18 is successively and alternatively filled with water and then tilted or inverted to dump the ice therefrom, is a continually operating process. It should be noted, however, that the length of time required to retract the plunger 53 of the power unit 52 is sufficient to enable the water in the ice trays to freeze before the respective trays are inverted and dumped upon subsequent heating of the power unit 52.

In order to prevent an excess accumulation of ice cubes in the collection basket 26 (FIGURE 1) the present invention contemplates means for sensing such excess accumulation and for discontinuing the ice forming operation of the apparatus 10 until a quantity of cubes have been subsequently removed from the basket 26.

Referring to FIGURE 1, an elongated rod or sensing arm 132 extends from the casing 16 between the top of the collection basket 26 and the ice trays 17 and 18 and is pivotally mounted on the casing 16 to traverse across the top of the basket 26 in a "sweeping" action after each of the ice trays is inverted and dumped and in the event that the sensing arm 132 engages ice particles projecting from the top of the basket suitable means are provided in association with the sensing arm to de-energize and deactivate the apparatus 10.

Referring to FIGURE 5, it will be noted that the sensing arm 132 extends through the casing 16 and through an aperture 133 formed in the casing wall 49. An end portion 134 of the sensing arm rises vertically to be received in a flange 136 formed on the casing wall 49. It will be noted that the aperture 133 is oblong to enable the sensing arm to pivot and traverse across the top of the collection basket 26.

The sensing arm 132 also extends through a groove 137 formed in a yoke member 138 which is mounted for relative rotation on the shaft 20a. An opposite end 139 of the yoke member 138 is pivotally connected by means of a pin 140 to a sliding cam member 141.

The cam member 141 is characterized as comprising a slot 142 which is shaped to receive the shaft 74 on which the driver gear 73 and the multi-face gear 79 are mounted. Also formed in the cam 141 is a second slot 143 bounded on one side thereof by a first cam surface 144 which leads to a second cam surface 146.

The cam 141 is also out as at 147 to receive a protuberance or projection 148 formed integrally with the driver gear 73.

The yoke member 138 is biased in a counterclockwise direction by means of a tension spring 149 which interconnects the yoke member and a flange 150 fixedly connected to the casing 16. In the position of the yoke member shown in FIGURE 5, the sensing arm 132 projects outwardly from the casing 16 and substantially diametrically across the top of the collection basket 26, that is, from a rear corner on one side of the basket to a front corner on an opposite side of the basket.

When the electric coil 69 is energized and the driver gear 73 begins its counterclockwise rotation, the protuberance 148 formed thereon engages the cam surface 146 of the cam 141 and begins to urge the cam rightwardly as viewed in FIGURE 5 such that the shaft 74 is effectively "moved" into the slot 142 formed in the cam.

Such rightward movement of the cam 141 is effective to rotate the yoke member 138 clockwise through a given arc to a position as shown in FIGURE 6 of the drawings. Such clockwise rotation of the yoke 138 is effective to pivot the sensing arm 132 such that it thereupon extends substantially parallel to the rear edge 150 of the casing 16 and along the back wall of the collection basket 26.

Continued rotation of the driver gear 73 moves the protuberance 148 into engagement with the cam surface 144 (as illustrated in the portion thereof in FIGURE 6) but it will be noted that in this position of the cam 141 the cam surface 144 is concentrically arranged with respect to the shaft 74, thereby precluding further leftward movement of the cam 141.

After the electric coil 69 is de-energized and the driver gear 73 begins its clockwise rotation, the cam member 141 will again be moved rightwardly as viewed in FIGURE 5 when the protuberance 148 has rotated sufficiently to engage the cam surface 146. The yoke member 138 is again biased to the position illustrated in FIGURE 5, and this counterclockwise rotation of the yoke member is effective to pivot or "sweep" the sensing arm 132 across the top of the collection basket 26.

Thus, it will be understood that the sensing arm 132 extends along the rear of the basket 26 when the respective ice trays are inverted to dump the ice particles therefrom, and gradually sweeps forwardly over the top of the collection basket 26 as the temperature sensitive power unit 52 cools and the driver gear 73 slowly rotates in a clockwise direction.

The sensing arm 132 is precluded from rotating in a clockwise direction as viewed in FIGURE 5 by means of a stop 136a formed on the flange 136 for abutting the end portion 134 thereof; but is continuously free to rotate in a counterclockwise direction to clear any ice in its path as it moves backwardly across the top of the collection basket 26 and to permit removal of the collection basket at any phase of operation.

Referring particularly to FIGURES 5, 6 and 9, it will be noted that the cam member 141 has formed thereon an axially inwardly extending abutment flange 152. In the position of the cam member 141 as shown in FIGURE 6, whereupon the yoke member 138 is pivoted clockwise and the sensing arm 132 extends along the backwall of the collection basket 26, the flange 152 is situated in vertical alignment with the shaft 74. In this position of the cam 141 the flange 152 resides in the path of travel of the pillar 96 of the pawl 77 and would thereby prevent the pawl 77 from moving radially outwardly when the radial wall 98 thereof rotates into alignment with a shoulder surface 92 of the gear 79.

It will thus be appreciated that in the event that the sensing arm 132 abuts ice particles as it sweeps forwardly across the top of the collection basket 26, its pivotal movement will be thereby restricted, thus preventing the cam 141 from moving from its position as illustrated in FIGURE 6 to the position thereof as shown in FIGURE 5. Accordingly, the pawl 77 will be prevented from moving radially outwardly upon full clockwise rotation of the driver gear 73 to engage the spring 104 of the electric switch 101 and thereby to close the contacts 102 and 103.

FIGURE 9 is illustrative of the position of the flange 152 when the sensing arm 132 has been able to sweep, without restriction, forwardly across the top of the collection basket 26. It will be noted that in this position the flange 152 is not in the path of nor does it impede the radially outward movement of the pawl 77, and as a consequence the contacts 102 and 103 will be closed by the pawl.

FIGURE 10, on the other hand, is illustrative of the position of the flange 152 with respect to the pillar 96 of the pawl 77 when the sensing arm 132 has been restricted in its "sweeping" action. In this instance it will be noted that the flange 152 lies in the path of travel of the pillar 96 and as a consequence the pawl 77 is restricted in its radial movement and cannot close the switch 101.

A removal of a sufficient quantity of ice cubes from the collection basket 26 will enable the sensing arm 132 to thereupon complete its "sweeping" action, the cam member 141 thereupon moving from its position as shown in FIGURE 6 to the position thereof as shown in FIGURE 5 with the flange 152 correspondingly moving from its position as shown in FIGURE 10 to the position thereof shown in FIGURE 9. The pawl 77 will then be "snapped" radially outwardly by the spring 77, whereupon the contacts 102 and 103 will be closed to energize the heating coil 69 and reactivate the ice making process.

FIGURE 8 is illustrative of an alternative linkage arrangement for rotating the driver gear 73 upon rectilinear movement of the follower bracket 57 and comprises a linking arm 153 pivotally connected at opposite ends thereof by means of pin members 154 and 156 to the lower section 71 of the follower bracket 57 and the driver gear 73. In other respects the embodiment of FIGURE 8 operates similarly to the embodiment of FIGURE 7 which utilizes the rack gear 70 on the follower 57 and the spiral-form gear teeth 72 formed on the driver gear 73.

Although minor modifications might be suggested by those versed in the art, it should be understood that I wish to embody within the scope of the patent warranted hereon all such modifications as reasonably come within the scope of my contribution to the art.

I claim as my invention:

1. Apparatus for making ice comprising, a frame, an ice tray adapted to eject ice therefrom upon rotation thereof, mounting means for rotatably mounting said tray on said frame, and means for imparting rotatable movement to said ice tray for ejecting ice therefrom and comprising, power means mounted on said frame and having a rectilinearly reciprocable power member, first and second rotatable members mounted on said frame for relative rotation therebetween, linking means operatively interconnecting said power member and said first rotatable member for effecting oscillatory rotatable movement to said first rotatable member upon rectilinear reciprocable movement of said power member, cooperating means on said first and said second rotatable members including a shoulder surface and a spring biased radially rectilinearly movable pawl engageable with said shoulder surface to effect intermittent rotation of said second rotatable member in one direction of rotation upon oscillatory rotatable movement of said first rotatable member, and driving means operatively interconnecting said second rotatable member and said ice tray to rotate said ice tray in response to rotation of said second rotatable member.

2. Apparatus for making ice comprising, a frame, an ice tray adapted to eject ice therefrom upon rotation thereof, mounting means for rotatably mounting said tray on said frame, and means for imparting rotatable movement to said ice tray for ejecting ice therefrom and comprising, first and second rotatable members mounted on said frame for relative rotation therebetween, power means mounted on said support and operatively connected to said first rotatable member for effecting oscillatory rotatable movement to said first rotatable member, cooperating means on said first and said second rotatable members including a radial shoulder surface and a spring biased radially rectilinearly movable pawl formed independently of said first and second rotatable member and engageable with said surface to effect intermittent rotation of said second rotatable member in one direction of rotation upon oscillatory rotatable movement of said first rotatable member, and driving means operatively interconnecting said second rotatable member and said ice tray to rotate said ice tray in response to rotation of said second rotatable member.

3. Apparatus for making ice comprising, a frame, an ice tray adapted to eject ice therefrom upon rotation thereof, mounting means for rotatably mounting said tray on said frame, and means for imparting rotatable movement to said ice tray for ejecting ice therefrom and comprising, first and second rotatable members mounted on said frame for relative rotation therebetween, electrically operated power means mounted on said support and operatively connected to said first rotatable member for effecting oscillatory rotatable movement thereof, cooperating clutch means on said first and said second rotatable members and including a radial shoulder surface and a radially inclined ramp leading to said surface and a radially movable pawl biased toward said ramp to be guided thereby to said shoulder surface upon relative rotation of said first and said second rotatable members, said clutch means being effective to provide intermittent rotation of said second rotatable member in one direction of rotation upon oscillatory rotatable movement of said first rotatable member, driving means operatively interconnecting said second rotatable member and said ice tray to rotate said ice tray in response to rotation of said second rotatable member, and switch means for electrically connecting said power means to a source of electric power for energization of said power means and operative in response to radial movement of said pawl.

4. Apparatus for making ice comprising, a frame, an ice tray adapted to reject ice therefrom upon rotation thereof, means for rotatably mounting said tray on said frame, first and second concentrically arranged rotatable members mounted on said frame for relative rotatable movement therebetween, electrically operated power means mounted on said frame and operatively connected to said first rotatable member for effecting oscillatory rotatable movement thereto, a radial shoulder surface and an inclined ramp leading to said surface formed on one of said rotatable members, a radially movable pawl mounted on the other of said rotatable members and biased into engagement with said ramp to be moved radially and guided into engagement with said shoulder surface thereby upon rotation of said first rotatable member in one direction of rotation thereof and to engage said shoulder surface to rotate said second rotatable member with said first rotatable member upon rotation of said first rotatable member in an opposite direction of rotation thereof whereby intermittent rotation of said second rotatable member is effected by oscillatory rotatable movement of said first rotatable member, driving means operatively interconnecting said second rotatable member and said ice tray to rotate said tray in response to rotation of said second rotatable member, switch means for electrically connecting said power means to a source of electric power and operatively engageable with said pawl for energization of said power means in response to radial movement of said pawl, an ice level sensing arm pivotally mounted on said frame to sweep below said trap between first and second positions to detect a collection of ice in the path of sweep thereof, means interconnecting said sensing arm and said first rotatable member for pivoting said sensing arm toward said first position thereof upon rotation of said first rotatable member in said one direction of rotation thereof, biasing means biasing said sensing arm towards said second position thereof upon rotation of said first rotatable member in said opposite direction of rotation thereof, and an abutment flange movable in response to movement of said sensing arm and situated in the path of radial movement of said pawl in engaging said shoulder surface when said sensing arm is in its first position and situated out of the path of radial movement of said pawl in engaging said shoulder surface when said sensing arm is in its second position.

5. Apparatus for making ice comprising, a frame, an ice tray adapted to eject ice therefrom upon rotation thereof, means for rotatably mounting said tray on said frame, first and second concentrically arranged rotatable members mounted on said frame for relative rotatable movement therebetween, electrically operated power means mounted on said frame and operatively connected to said first rotatable member for effectively oscillatory rotatable movement thereof, a radial shoulder surface and a circumferentially extending radially inclined ramp leading to said surface formed on one of said rotatable members, a radially movable pawl mounted on the other of said rotatable members and biased into engagement with said ramp to be moved radially and guided into engagement with said shoulder surface thereby upon rotation of said first rotatable member in one direction of rotation thereof and to engage said shoulder surface to rotate said second rotatable member with said first rotatable member upon rotation of said first rotatable member in an opposite direction of rotation thereof whereby intermittent rotation of said second rotatable member is effected by oscillatory rotatable movement of said first rotatable member, driving means operatively interconnecting said second rotatable member and said ice tray to rotate said tray in response to rotation of said second rotatable member, switch means for electrically connecting said power means to a source of electrical power and operatively engageable with said pawl for energization of said power means in response to radial movement of said pawl into engagement with said shoulder surface, an ice level sensing arm pivotally mounted on said frame to sweep below said ice tray between first and second positions to detect a collection of ice in the path of sweep thereof, a yoke mechanism pivotally mounted on said frame and operatively connected to and movable with said sensing arm for pivoting said sensing arm, cam means interconnecting said yoke mechanism and said first rotatable member and effective to move said yoke mechanism in one pivotal direction thereof and said sensing arm toward said first position thereof upon rotation of said first rotatable member in said one direction of rotation thereof, biasing means for urging said yoke mechanism in an opposite pivotal direction thereof and said sensing arm toward said second position thereof upon rotation of said first rotatable member in said opposite direction of rotation thereof, said sensing arm being disposed so as to be restricted in its movement from said first to said second positions by ice collected below said tray in the path of sweep of said sensing arm, and an abutment flange movable in response to movement of said sensing arm and situated in the path of radial movement of said pawl in engaging said shoulder surface when said sensing arm is in its first positions and situated out of the path of radial movement of said pawl in engaging said shoulder surface when said sensing arm is in its second position.

6. Apparatus for making ice comprising, a frame, an ice tray adapted to eject ice therefrom upon rotation thereof, means for rotatably mounting said tray on said frame, first and second concentrically arranged rotatable members mounted on said frame for relative rotatable movement therebetween, electrically operated power means mounted on said frame and operatively connected to said first rotatable member for effecting oscillatory rotatable movement of said first rotatable member, driving means operatively interconnecting said second rotatable member and said tray to rotate said tray in response to rotation of said second rotatable member, a radial shoulder surface and a circumferentially extending radially inclined ramp leading to said surface formed on one of said rotatable members, a radially movable pawl mounted on the other of said rotatable members and rotatable therewith, biasing means on said other of said rotatable members for biasing said pawl radially into engagement with said ramp to be guided by said ramp to said shoulder surface and then radially into engagement with said surface upon rotation of said first rotatable member in one direction of rotation thereof, said pawl being effective upon engagement with said shoulder surface to rotate said second rotatable member corotatably with said first rotatable member upon rotation of said first rotatable member in an opposite direction of rotation thereof, an electric switch stationarily positioned adjacent said rotatable members at one radial position with respect thereto and electrically connected to said power means for controlling the energization thereof, said switch having a pair of contacts and biasing means for biasing said contacts out of engagement with each other, a radially extending wall surface formed on said one of said rotatable members and normally engageable with one of said contacts to urge said one contact into engagement with the other of said contacts against said bias, a recess formed in said radial wall adjacent said shoulder surface to receive said one of said contacts biased thereinto when said shoulder surface is rotated into position adjacent said one contact, an axially inclined wall formed on said pawl for urging said one of said contacts out of said recess and into engagement with the other of said contacts upon radial movement of said pawl into engagement with said shoulder surface, and ice collection sensing means mounted on said frame and comprising, a sensing arm for detecting a given collection of ice below said tray, and abutment means mounted on said frame and movable in response to the detection of said given collection of ice to restrict radial movement of said inclined wall of said pawl into engagement with said one of said contacts whereby said contacts remain open and said power means de-energized.

7. The apparatus for making ice as defined in claim 6 wherein said radially movable pawl is mounted on said first rotatable member and said shoulder surface, said inclined ramp and said radially extending wall surfaces are formed on said second rotatable member.

8. The apparatus for making ice as defined in claim 6 wherein said power means comprises, a temperature sensitive power unit having a rectilinearly telescopically extensible piston, an electric heater for heating said power unit and electrically connected to said switch, and means interconnecting said piston and said first movable member for translating rectilinear movement of said piston into rotatable movement of said first rotatable member.

9. The apparatus for making ice as defined in claim 6 and including, an electrically operated water flow valve mounted on said frame and electrically connected to said switch for energization of said valve and adapted to be connected to a source of water to fill said tray after the ice therein has been ejected therefrom.

10. A clutch-actuated switch assembly comprising, a rotatable driving member, means operative to provide oscillatory rotatable movement to said driving member, a rotatable driven member, clutch means interconnecting said driving and said driven members and operative to translate said oscillatory rotatable movement of said driving member into intermittent unidirectional rotation of said driven member, said clutch means comprising a radial shoulder surface rotatable with one of said members and a radially movable pawl rotatable with the other of said members and engageable with said shoulder surface to effect said intermittent unidirectional rotation of said driven member in response to said oscillatory rotatable movement of said driving member, and switch means engageable with and responsive to said radial movement of said pawl for effecting opening and closing of an electric circuit.

11. A clutch-actuated switch assembly comprising, a rotatable driving member, means operative to provide oscillatory rotatable movement to said driving member, a rotatable driven member, clutch means interconnecting said driving and said driven members and operative to translate said oscillatory rotatable movement of said driving member into intermittent unidirectional rotation of said driven member, said clutch means comprising a radial shoulder surface rotatable with one of said members and a radially movable pawl rotatable with the other of said members and engageable with said shoulder surface to effect said intermittent unidirectional rotation of said driven member in response to said oscillatory rotatable movement of said driving member, switch means engageable with and responsive to said radial movement of said pawl for effecting opening and closing of an electric circuit, and signal sensing means movable into position between said pawl and said switch means upon receipt of a given signal and thereby operative to render said pawl ineffective with respect to the operation of said switch means.

References Cited by the Examiner

UNITED STATES PATENTS

| | | | |
|---|---|---|---|
| 2,941,379 | 6/1960 | Nelson | 62—353 X |
| 3,021,687 | 2/1962 | Dawson et al. | 62—135 |
| 3,048,023 | 8/1962 | Taylor | 62—135 |
| 3,188,827 | 6/1965 | Bauerlein | 62—353 |

MEYER PERLIN, *Primary Examiner.*

ROBERT A. O'LEARY, *Examiner.*

W. E. WAYNER, *Assistant Examiner.*